(12) United States Patent
Comay et al.

(10) Patent No.: US 6,363,489 B1
(45) Date of Patent: Mar. 26, 2002

(54) METHOD FOR AUTOMATIC INTRUSION DETECTION AND DEFLECTION IN A NETWORK

(75) Inventors: Oded Comay, Tel Aviv; Doron Shikmoni, Tikva; Yehezkel Yeshurun, Givatayim; Oded Amir, Tel Aviv, all of (IL)

(73) Assignee: Forescout Technologies Inc., Wilmington, DE (US)

( * ) Notice: Subject to any disclaimer, the term of this patent is extended or adjusted under 35 U.S.C. 154(b) by 0 days.

(21) Appl. No.: 09/449,531

(22) Filed: Nov. 29, 1999

(51) Int. Cl.$^7$ .................................. G06F 11/30
(52) U.S. Cl. ...................... 713/201; 709/224
(58) Field of Search ...................... 713/200, 201; 709/223, 224, 225, 227, 228

(56) References Cited

FOREIGN PATENT DOCUMENTS

WO 00/56009 * 9/2000 ............ H04L/9/32

* cited by examiner

Primary Examiner—Gail Hayes
Assistant Examiner—Christopher A. Revak
(74) Attorney, Agent, or Firm—Mark M. Friedman

(57) ABSTRACT

A method and a system for providing security to a network by at least identifying an unauthorized user who is attempting to gain access to a node on the network, and preferably by then actively blocking that unauthorized user from further activities. Detection is facilitated by the unauthorized user providing a "mark", or specially crafted false data, which the unauthorized user gathers during the information collection stage performed before an attack. The mark is designed such that any attempt by the unauthorized user to use such false data results in the immediate identification of the unauthorized user as hostile, and indicates that an intrusion of the network is being attempted. Preferably, further access to the network is then blocked by diverting traffic from the unauthorized user to a secure zone, where the activities of the unauthorized user can be contained without damage to the network.

16 Claims, 3 Drawing Sheets

METHOD FOR AUTOMATIC INTRUSION DETECTION AND DEFLECTION IN A NETWORK

FIELD AND BACKGROUND OF THE INVENTION

The present invention relates to a method for automatic intrusion detection and deflection in a network, and in particular, to such a method which uses marking to detect the presence of an intruder, after which the intruder can be diverted from further attempts to attack the network, such that access of the intruder to the network is prevented.

Large amounts of data are transmitted on a daily basis through computer networks, and particularly through the Internet. Perhaps owing to its origins as an academic tool, the Internet is geared toward the efficient transport of data from one endpoint to one or more endpoints, and not on the security of nodes on the network. Therefore, unauthorized users or "hackers" have unfortunately gained relatively easy access to networks as well as to nodes on the network through the Internet. Many such unauthorized users may not have criminal intent, yet may still inflict damage, by intruding on privacy, disrupting computer systems and defacing Web sites. More serious offenses may have consequently more serious damage, such as information theft and/or alteration, in which proprietary, commercial information may be stolen and sold or misused. In addition, computer system damage may occur, requiring the repair of damages inflicted by unauthorized users.

In an attempt to overcome these problems, various protective methods and devices, such as Firewalls and Intrusion Detection Systems (IDS), have been proposed. Unfortunately, knowledgeable attackers can often circumvent firewalls, and the IDS is prone to inaccuracy, as it is a heuristic system. Such inaccuracy often results in a high rate of false alarms, which nullifies the usefulness of such a system.

These problems stem from the infrastructure of networks in general, and of the Internet in particular. In the Internet, communication, between a computer site which hosts a data resource and the computer of a user, is performed according to the TCP/IP communication protocol suite. According to this protocol, the handshake procedure follows a certain set of steps which are easily examined and then imitated. Thus, a useful security protection method for a network would detect the stage in which information is gathered about the handshake procedure and about the network, and would then block any attempted activity by an unauthorized user detected in the information gathering stage. Unfortunately, such a security protection method is not available.

There is thus a need for, and it would be useful to have, a method for protecting the security of a network by detecting the stage in which information is gathered by the unauthorized user, identifying the unauthorized user when an attempt is then made to gain access to a node on the network, and preferably then actively blocking the unauthorized user from such attempts at access.

BRIEF DESCRIPTION OF THE DRAWINGS

The foregoing and other objects, aspects and advantages will be better understood from the following detailed description of a preferred embodiment of the invention with reference to the drawings, wherein.

SUMMARY OF THE INVENTION

Figure 1:
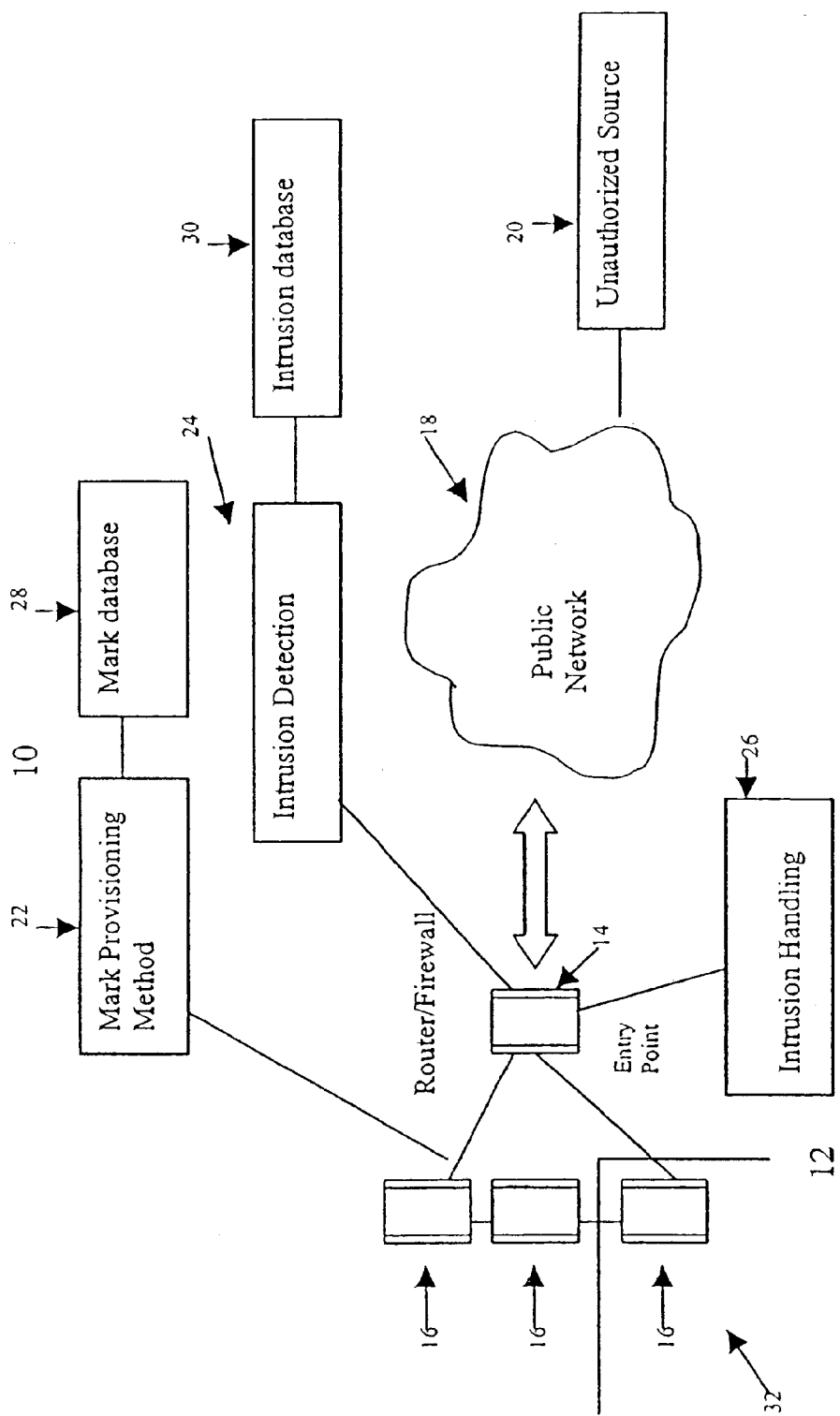
FIG. 1 is a schematic block diagram of an exemplary system according to the present invention.

The present invention is of a method and a system for providing security to a network by at least identifying an unauthorized user who is attempting to gain access to a node on the network, and preferably by then actively blocking that unauthorized user from further activities. Detection is facilitated by the unauthorized user carrying a "mark". The mark is specially crafted false data, which the unauthorized user gathers during the information collection stage performed before an attack. The mark is designed such that any attempt by an unauthorized user to use such false data results in the immediate identification of the unauthorized user as hostile, and indicates that an intrusion of the network is being attempted. Preferably, further access to the network is then blocked by diverting traffic from the unauthorized user to a secure zone, where the activities of the unauthorized user can be contained without damage to the network.

According to the present invention, there is provided a method for detecting and handling a communication from an unauthorized source on a network, the method comprising the steps of: (a) receiving the communication from the unauthorized source; (b) analyzing the communication for detecting an information gathering procedure; (c) if the information gathering procedure is detected, indicating a source address of the communication as an intruder source address; (d) returning a mark to the unauthorized source of the communication; (e) analyzing each subsequent communication for a presence of the mark; (f) if the mark is present, indicating the source address of the communication as the intruder source address; and (g) if the source address is the intruder source address, handling the communication from the intruder source address.

According to another embodiment of the present invention, there is provided a system for detecting and handling the communication from an unauthorized source on a network, the system comprising: (a) an entry point to the network, such that the communication passes through the entry point to reach the network; (b) a mark provisioning module for preparing marks for sending to the unauthorized source; (c) an intrusion detection module for analyzing the communication and for detecting the mark in the communication; and (d) an intrusion handling module for handling the communication if the mark is detected by the intrusion detection module.

Preferably, the communication is in the form of packets, although other types of network communication are also possible within the scope of the present invention.

Hereinafter, the term "network" refers to a connection between two or more computers, which allows these computers to communicate. Hereinafter, the term "node" refers to a device, particularly a computer, which is connected to a particular network.

Hereinafter, the term "computer" refers to a combination of a particular computer hardware system and a particular software operating system. Examples of such hardware systems include those with any type of suitable data processor. Hereinafter, the term "computer" includes, but is not limited to, personal computers (PC) having an operating system such as DOS, Windows™, OS/2™ or Linux; Macintosh™ computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystems™; a PalmPilot™, a PilotPC™, or any other handheld device; or any other known and available operating system. Hereinafter, the term "Windows™" includes but is not limited to Windows95™, Windows 3.x™ in which "x" is an integer such as "1", Windows NT™, Windows98™, Windows CE™ and any upgraded versions of these operating systems by Microsoft Corp. (USA).

For the present invention, a software application could be written in substantially any suitable programming language, which could easily be selected by one of ordinary skill in the art. The programming language chosen should be compatible with the computer by which the software application is executed, and in particularly with the operating system of that computer. Examples of suitable programming languages include, but are not limited to, C, C++ and Java. Furthermore, the functions of the present invention, when described as a series of steps for a method, could be implemented as a series of software instructions for being operated by a data processor, such that the present invention could be implemented as software, firmware or hardware, or a combination thereof.

Hereinafter, the term "probe" refers to the information collection phase performed by an unauthorized user to gather information as an aid to actually mounting an intrusion of a network.

Hereinafter, the phrase "proactively handling" refers to preventing access, for example by blocking or diverting a packet or other unit of data from access to a network.

DETAILED DESCRIPTION OF THE INVENTION

The present invention is of a method and a system for providing security to a network by at least identifying an un authorized user who is attempting to gain access to a node on the network, and preferably by then actively blocking that unauthorized user from further activities. Detection is facilitated by providing an "mark", or specially crafted false data, which the unauthorized user gathers during the information collection stage performed before an attack. The information collection stage typically involves a process of probing the network in order to collect information concerning the vulnerabilities and weaknesses of the network. The mark is designed such that any attempt by the unauthorized user to use such false data results in the immediate identification of the unauthorized user as hostile, and indicates that an intrusion of the network is being attempted.

Once the unauthorized user has been identified as hostile, a few possibilities are available. In an active embodiment of the method of the present invention, further activities by the unauthorized user are proactively handled, preferably by being blocked. More preferably, traffic from the source controlled by the unauthorized user is diverted to a secure zone of the network, in which the intruder cannot cause actual damage.

The principles and operation of a method and a system according to the present invention may be better understood with reference to the drawings and the accompanying description, it being understood that these drawings are given for illustrative purposes only and are not meant to be limiting. Although the following description centers upon a packet-switched network, in which communication is performed and data is transmitted in the form of packets, it is understood that this is for the purposes of description only, and is without any intention of being limiting, as the present invention is also operable with other types of networks.

Referring now to the drawings, FIG. 1 is a schematic block diagram of a system in accordance with the present invention. A system 10 features a protected network 12 with an entry point 14. Preferably, all traffic that passes into protected network 12 must pass through entry point 14, although a plurality of such entry points 14 may be present on protected network 12. Entry point 14 may optionally be implemented as a router and/or firewall, for example. Once network traffic, typically packets, enters through entry point 14, the traffic may then be transmitted to one or more nodes 16 connected to protected network 12. It is understood that the structure of protected network 12 has been simplified for the sake of clarity, and is not meant to be limiting in any way.

Entry point 14 is connected to a public network 18, which may be, for example, the Internet. It is understood that entry point 14 may also be connected to a dial-up access point, in addition to or in place of public network 18. An unauthorized source 20 is shown connected to public network 18, which is operated by an unauthorized user. Although only one unauthorized source 20 is shown, it is understood that this is for the purposes of description only and without any intention of being limiting, as a plurality of such unauthorized sources 20 is possible, even when operated by a single unauthorized user. Unauthorized source 20 may be a computer for example, or alternatively may include one or more additional networks in addition to the computer of the user. The unauthorized user controls unauthorized source 20 in an attempt to gain access to protected network 12, for example by sending packets containing commands or instructions to protected network 12.

In addition, the unauthorized user typically performs an information collection stage about protected network 12 which involves communication with entry point 14, and/or "sniffing" incoming and outgoing network traffic through entry point 14 for information. The unauthorized user then uses the collected information about the vulnerabilities and weaknesses of protected network 12 to launch an attack.

In the background art, entry point 14 would feature a firewall, which would attempt to filter incoming network traffic in order to prevent unauthorized entry to protected network 12. However, unauthorized users are often able to circumvent such a firewall or other protective measure installed at entry point 14.

According to the present invention, in place of or in addition to the firewall as known in the background art, one or more security modules are installed on protected network 12, preferably at entry point 14. Such security modules may be implemented as one unit or as a plurality of such units, and may also be implemented as software, firmware, hardware or a combination thereof as previously described. According to a preferred embodiment of the present invention, three such modules are installed on protected network 12: a mark provisioning module 22, an intrusion detection module 24 and optionally an intruder diversion module 26. The latter modules are preferably installed at entry point 14.

Mark provisioning module 22 provides false information to unauthorized source 20 and hence to the unauthorized user. The false information acts as mark and enables traffic from unauthorized source 20, or even from a different unauthorized source (not shown) to be identified later if an intrusion attempt is made. Preferably, the false information is given by the mark provisioning module 22, emulating responses to "probes" as if the responses were generated by real nodes on protected network 12, although such nodes might not really be in existence. Mark provisioning module 22 provides this information according to techniques which matches the probing method used by unauthorized users to gather information, as described in greater detail with regard to FIG. 2 below. However, the mark, or false information, also includes an identifier for later identifying the unauthorized user. Preferably, the identifier features numeric data, which can be identified easily and preferably uniquely in order to avoid mistaken identification of an authorized user as being unauthorized. Optionally and alternatively, mark provisioning module 22 is not installed at entry point 14, but can communicate with entry point 14.

Intrusion detection module 24 and optionally intrusion diversion module 26 are installed at entry point 14, in order to be able to monitor all incoming and outgoing traffic, or to affect incoming traffic, respectively. Intrusion detection module 24 operates by inspecting and analyzing packets, which arrive to entry point 14. Intrusion detection module 24 then matches the information found within the incoming packets to a mark database 28 of false information, which contains the identifiers for identifying the false, "mark", information. Once a match is found, for example in packets from unauthorized source 20, unauthorized source 20 is registered in an intruder database 30, including the source address of unauthorized source 20 or other intruder identifying factor. It should be noted that mark database 28 and intruder database 30 may optionally be implemented in a single database, but are shown in FIG. 1 as separate in order to illustrate the separate functions thereof.

Intrusion diversion module 26 optionally captures all packets, which feature the intruder-identifying factor, such as the source address of unauthorized source 20 for example. The received packets are then preferably handled proactively, and more preferably are redirected. Most preferably, such redirection is performed such that the packet is redirected to a secure zone 32 within protected network 12. First, the destination address of the received packet could optionally be changed to a secure address of a particular node 16 within secure zone 32. Next, the source address is changed to an intrusion diversion address assigned to intrusion diversion module 26.

This redirection process is actually a version of a NAT (Network Address Translation) process. Within the present invention, preferably all response packets from node(s) 16 within secure zone 32 pass to intrusion diversion module 26. Intrusion diversion module 26 then changes back the source address of each response packet to the original destination address of the packet as received from unauthorized source 20, and the destination address of each response packet to that of unauthorized source 20. Upon receipt of each response packet by unauthorized source 20, an analysis of the packet would show that apparently the packet had been processed and sent by the intended destination node 16 of protected network 12. In reality, of course, the entire process of sending the response packet, including the determination of the content of that packet, has been controlled and managed by intrusion diversion module 26. A more detailed explanation of this process is provided in FIG. 3 below.

Figure 2:
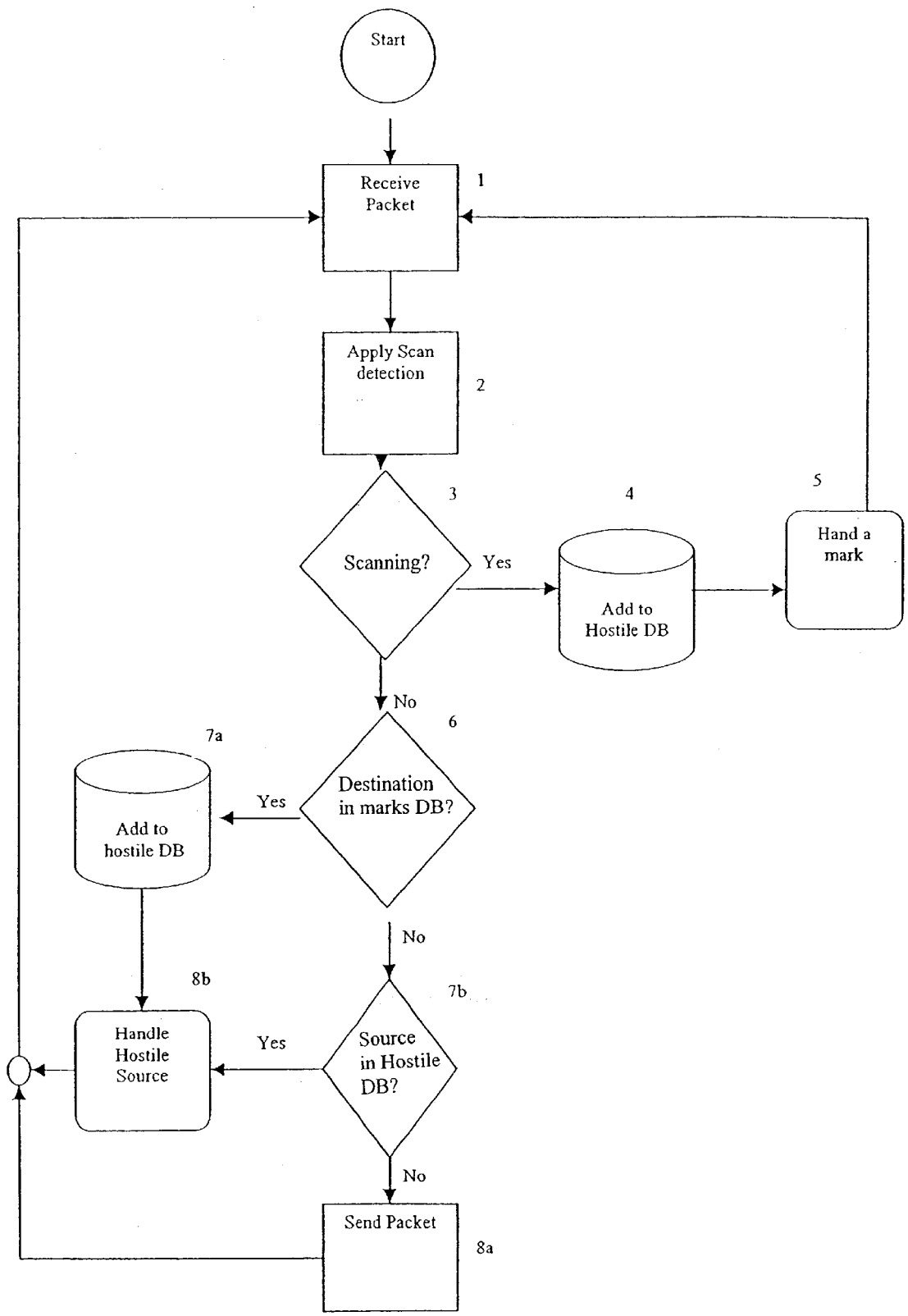
FIG. 2 is a flowchart of an exemplary method for probe and intrusion detection according to the present invention.

FIG. 2 is a flowchart of an exemplary method for probe and intrusion detection according to the present invention. The method of probe and intrusion detection is described below with regard to the detection of a particular type of probe, which is a "scan" to search for vulnerable services on the network. The scan probe is an example only of one type of probe which may be detected and handled according to the present invention. As described in greater detail below, other types of probes may optionally also be detected and handled according to the present invention, such that the example with regard to scan detection is not intended to be limiting in any way.

In step 1, a packet is received, for example, by the intrusion detection module of FIG. 1. Next, the packet is analyzed for scan detection in step 2. A "scan" in this case is a method of information collection which is used by "hackers", or unauthorized users, to probe for possibly vulnerable services in the network. These services are scanned by the unauthorized user using a specially designed tool. Once a vulnerable service is found, the unauthorized user causes packets to be sent to nodes within the network, in order to determine whether the service actually exists. Scan detection can optionally be performed according to the present invention by a heuristic packet-based procedure. The procedure operates by maintaining statistics regarding the nature of packets and of packet transmission originating from all sources, in order to determine a profile of ranges of legitimate packet behavior. If the traffic from a particular source does not behave within these ranges, then the output of the procedure indicates the probability of whether a scan is being performed by that source. Optionally and more preferably, a minimum required probability of a scan being performed is previously calculated to set the limit above which a scan is determined to be in progress.

Once a scan has been detected, in step 4, the source address of the packets for the scan is added to the intruder database. In step 5, a mark is returned to the unauthorized source of the packets. Preferably, marks are provided for a scan attack by emulating one or more services, which do not exist and which are not advertised to computers outside the network. For example, for a TCP/IP network, the mark according to the present invention may optionally include an IP address for a non-existent host in response to a probe by the unauthorized user. Alternatively, the mark may contain a tuple consisting of an IP address and a port number.

In step 6, if a scan is not detected, then preferably the destination address of the packet is examined to see if the destination address is present in the mark database. If the destination address of the packet is in the mark database, then the source address of the packet, optionally with other identifying information, is added to the intruder database in step 7a. Preferably, the mark database is structured such that each entry has the form of <IP Address, Port Number>. Such an entry represents a false network service, which does not exist on the network. Thus, accessing such a network service is considered to be hostile, indicating the presence of an intruder, as legitimate users would not attempt to access the service.

Otherwise, in step 7b, the source address of the packet is examined to see if the source address can be found in the intruder database. If the source address is not stored in the intruder database, then in step 8a, the packet is passed to the network.

Figure 3:
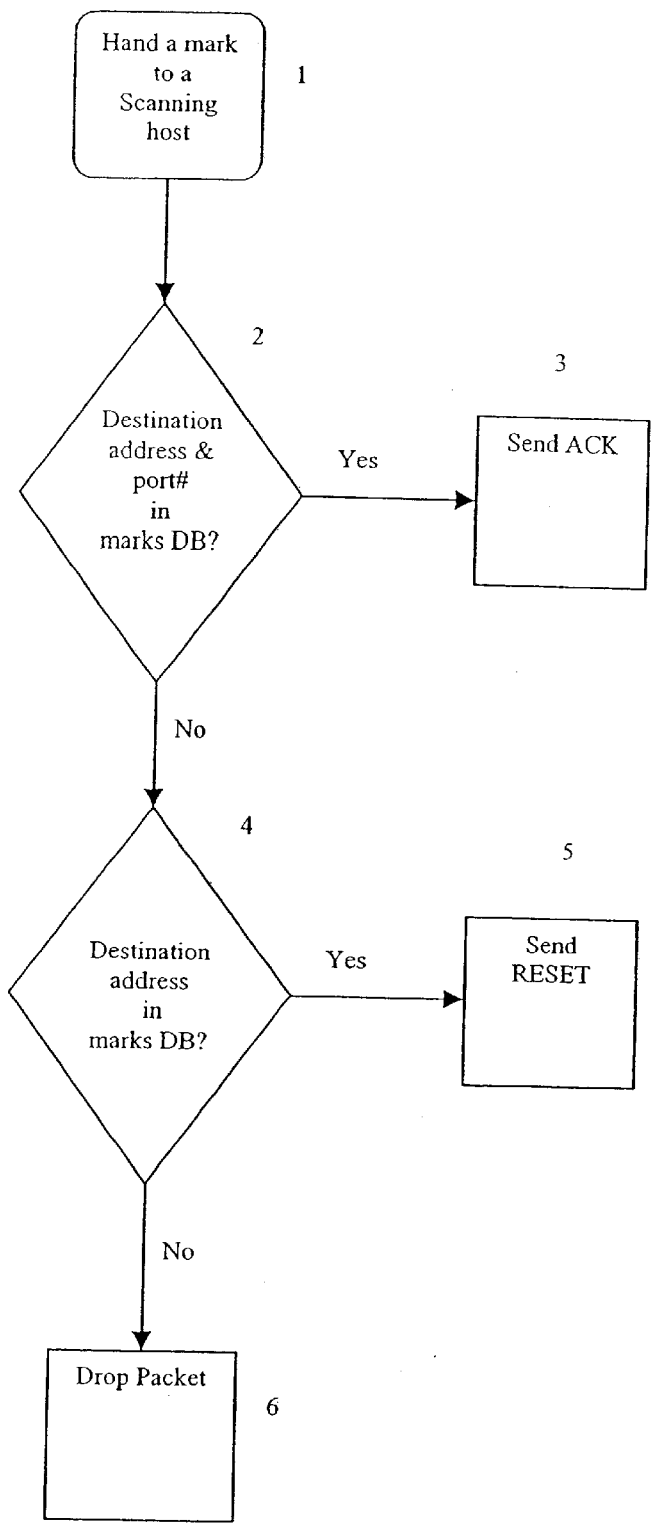
FIG. 3 is a flowchart of an exemplary method for intrusion handling according to the present invention.

Alternatively, if the source address is found in the intruder database, or if the source address is added to the intruder database in step 7a, the unauthorized source of the packet is proactively handled as described with regard to FIG. 3. Preferably, further packets from the unauthorized source are blocked from entering the network itself, more preferably by containing these packets in a secure zone through diverting or redirecting the packets. Optionally, a system administrator or other responsible individual may be additionally notified, for example. Alternatively, the packet may simply be dropped.

FIG. 3 is a flowchart of an exemplary method for handling an intrusion according to the present invention, continuing the example of FIG. 2. Therefore, the method for handling an intrusion is described below with regard to the particular type of probe of FIG. 2, which is the scan. As for FIG. 2, this is an example only of one type of probe, which may be detected and handled according to the present invention. As described in greater detail below, optionally other types of probes and intrusions may also be detected and handled according to the present invention, such that the example with regard to the probe of scan detection is not intended to be limiting in any way.

In step 1, as described also in FIG. 2, a mark is given to an unauthorized source. In step 2, the destination address of a subsequent packet is examined to see if the destination address and also the port number are present in the mark database. If the destination address and the port number are contained in the mark database, then in step 3, a send ACK procedure is performed. A send ACK procedure according to the present invention involves sending packets, which imitate an existing network service. The actual steps involved depend upon such variables as the type of network. For example, for a TCP/IP network, the send ACK procedure involves sending a plurality of packets to establish a connection between the initiating host, which is the unauthorized intruder source, and the destination of the packets. The unauthorized source is thus involved in a session with the imitative, false network service rather than with the actual service on the network.

If the destination address and the port number are not contained in the marks database, then alternatively in step 4, the mark database is examined to see if only the destination address is present. If so, then in step 5, a send RESET procedure is performed, which sends packets imitating a non-existent network service. As for the send ACK procedure described above, the actual steps involved depend upon such variables as the type of network. For example, for a TCP/IP network, the send RESET procedure can be accomplished by sending a single packet.

In step 6, if the destination address is not contained in the mark database, then the packet is dropped, or discarded without sending an acknowledgment. Such an act appears to the unauthorized source as though the intended destination host does not exist.

These methods of handling packets from the unauthorized source are intended only as examples, as other such methods could also be performed. The intent of these methods is to proactively handle the incoming packets from the unauthorized source, preferably by limiting the access of the packets of the unauthorized source to a restricted portion of the network, more preferably while giving the unauthorized source the false impression that the communication has been successful.

Other examples of different types of probing procedures which may optionally be detected and handled according to the present invention include, but are not limited to, DNS (Domain Name Service) zone transfer, a "finger" probe, NIS/LDAP interrogation and sniffing. The method for detecting each of these different probing procedures is described in greater detail below. These probing procedures can be handled as previously described for the scan probe.

The DNS zone transfer probe involves the interrogation of a DNS server in order to receive a list of host names and addresses in the network. Marks against this method are prepared by defining names and addresses of non-existent hosts within the network at the DNS server. The identifier associated with such a mark is the IP address of the non-existent host.

The "finger" probe is performed by interrogating a host computer, which is a node on the network, for active users with the "finger" service of the UNIX operating system. Replying to such an interrogation with the name of a non-existent user or users provides the marks for this method. The mark is in the form of <IP address, user name>, such that this combination provides the identifier for detecting any subsequent intrusion attempts.

NIS/LDAP interrogation involves NIS and/or LDAP databases which are often used to store site-specific information and which provide access methods over the network. Unless these databases are protected, the unauthorized user can interrogate these databases remotely, and retrieve information such as user names, encrypted passwords, network node (computer) names and addresses, and so forth. Marks against this probing method are prepared by constructing a fake NIS and/or LDAP database, which contain any of the previously described information items as mark.

The sniffing method involves recording network activities within the network, particularly after the unauthorized user has penetrated the network and has gained high level privileges. Software tools exist which facilitate recording user names and passwords included in sessions over the network. Marks against this probing method are provided by simulating sessions over the network, and including fake user names and passwords during these "sessions". The mark has the form of <IP address, user name, password>.

It will be appreciated that the above descriptions are intended only to serve as examples, and that many other embodiments are possible within the spirit and the scope of the present invention.

What is claimed is:

1. A method for detecting and handling a communication from an unauthorized source on a network, the method comprising the steps of:
   (a) receiving the communication from the unauthorized source;
   (b) analyzing the communication for detecting an information gathering procedure;
   (c) if said information-gathering procedure is detected, indicating a source address of the communication as a suspected network reconnaissance collector;
   (d) returning an earmark to said suspected reconnaissance collector, such that said earmark includes specially crafted false data, and such that said earmark includes data that can serve to identify an unauthorized source;
   (e) analyzing each subsequent communication for a presence of said earmark;
   (f) if said earmark is present, indicating source address of the communication as a suspected network reconnaissance collector, and
   (g) if said source address is said intruder source address, applying intrusion handling procedures towards the communication from said intruder source address.

2. The method of claim 1, wherein the communication is performed with a plurality of packets.

3. The method of claim 2, further comprising the steps of:
   (h) If said intrusion procedure is not detected, examining a destination address of each packet to determine if said destination address is a mark destination address; and
   (i) If said destination address is a mark destination address, marking said source address of said packet as said intruder source address.

4. The method of claim 3, further comprising the steps of:
   (j) If said address is not said mark destination address, examining said source address of said packet to determine if said source address is said intruder source address; and (k) If said source address of said packet is not said intruder source address, passing said packet to the network.

5. The method of claim 1, wherein step (g) is performed by alerting a system administrator.

6. The method of claim 1, wherein step (g) is performed by dropping the communication.

7. The method of claim 1, wherein step (g) is performed by redirecting the communication to a secure zone of the network.

8. The method of claim 7, wherein step (g) further comprises the step of returning a response to the unauthorized source from said secure zone of the network.

9. The method of claim 8, wherein said information gathering procedure is selected from the group consisting of a scan, a DNS (Domain Name Service) zone transfer, a "finger" probe, NIS/LDAP interrogation and sniffing.

10. The method of claim 9, wherein the communication is performed with a plurality of packets, the network features a plurality of nodes and said intrusion procedure is said scan, such that step (b) further comprises the steps of:

(i) analyzing a plurality of packets from said plurality of nodes;

(ii) determining a profile of ranges of legitimate packet behavior; and (iii) if at least one packet from the unauthorized source lies outside said ranges, determining a probability that said scan is being performed.

11. The method of claim 10, wherein if said probability is above a minimum required probability of a scan being performed, said scan is detected.

12. The method of claim 11, wherein said mark includes an emulation of a non-existent service.

13. The method of claim 12, wherein said emulation includes an IP address for a non-existent host.

14. The method of claim 13, wherein said emulation further includes a port number.

15. A system for detecting and handling the communication from an unauthorized source on a network, the system comprising:

(a) An entry point to the network such that the communication passes through said entry point to reach the network;

(b) An earmark provisioning module for preparing earmarks for sending to unauthorized source, such that said earmarks are specially crafted false data that will identify an unauthorized source;

(c) An intrusion detection module for analyzing the communication and for detecting said earmark in the communication; and (d) An intrusion-handling module for handling the communication if said earmark is detected by said intrusion detection module.

16. The system of claim 15, wherein the communication is performed with a plurality of packets.

* * * * *

UNITED STATES PATENT AND TRADEMARK OFFICE
CERTIFICATE OF CORRECTION

PATENT NO. : 6,363,489 B1
DATED : March 26, 2002
INVENTOR(S) : Comay et al.

It is certified that error appears in the above-identified patent and that said Letters Patent is hereby corrected as shown below:

Column 8,
Line 39, claim 1, should read as follows:
(c) if said informantion gathering procedure is detected, indicating a source address of the communication as a suspected network reconnaissance collector;

Signed and Sealed this

Twenty-second Day of March, 2005

JON W. DUDAS
*Director of the United States Patent and Trademark Office*